United States Patent
Cheong et al.

(10) Patent No.: US 9,862,377 B2
(45) Date of Patent: Jan. 9, 2018

(54) APPARATUS AND METHOD FOR CONTROLLING HYBRID ELECTRIC VEHICLE INCLUDING DUAL CLUTCH TRANSMISSION

(71) Applicants: HYUNDAI MOTOR COMPANY, Seoul (KR); KIA MOTORS CORPORATION, Seoul (KR)

(72) Inventors: Seong Hwan Cheong, Suwon-si (KR); Ju Hyun Nam, Bucheon-si (KR); Byeong Wook Jeon, Seoul (KR); Young Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 65 days.

(21) Appl. No.: 15/169,871

(22) Filed: Jun. 1, 2016

(65) Prior Publication Data
US 2017/0166193 A1 Jun. 15, 2017

(30) Foreign Application Priority Data
Dec. 14, 2015 (KR) .......................... 10-2015-0178257

(51) Int. Cl.
*B60L 9/00* (2006.01)
*B60W 20/30* (2016.01)
(Continued)

(52) U.S. Cl.
CPC ............... *B60W 20/30* (2013.01); *B60K 6/36* (2013.01); *B60K 6/387* (2013.01); *B60K 6/48* (2013.01);
(Continued)

(58) Field of Classification Search
CPC .................. B60W 20/30; B60W 10/02; B60W 30/18109; B60L 7/10; Y02T 10/76; Y10S 903/946
(Continued)

(56) References Cited

U.S. PATENT DOCUMENTS

2007/0173372 A1* 7/2007 Ueno ....................... B60K 6/48
477/3
2015/0135876 A1* 5/2015 Novak ................ F16H 61/0031
74/473.11
(Continued)

FOREIGN PATENT DOCUMENTS

JP 4140188 6/2008
JP 2011-099470 A 5/2011
(Continued)

*Primary Examiner* — Shardul Patel
(74) *Attorney, Agent, or Firm* — Brinks Gilson & Lione

(57) ABSTRACT

A method and an apparatus for controlling a hybrid electric vehicle are provided. The method includes: determining whether a coasting condition is satisfied and whether a current gear stage is greater than or equal to a predetermined gear stage; determining whether a brake pedal is pushed when the coasting condition is satisfied and the current gear stage is greater than or equal to the predetermined gear stage; determining whether deceleration of the hybrid electric vehicle is less than a predetermined deceleration when the brake pedal is pushed; connecting a speed gear to an output shaft when the deceleration of the hybrid electric vehicle is less than the predetermined deceleration; determining whether a shift condition before stopping from a current gear stage to a target gear stage is satisfied; and locking up a shift clutch when the shift condition before stopping is satisfied.

9 Claims, 3 Drawing Sheets

Figure 1:
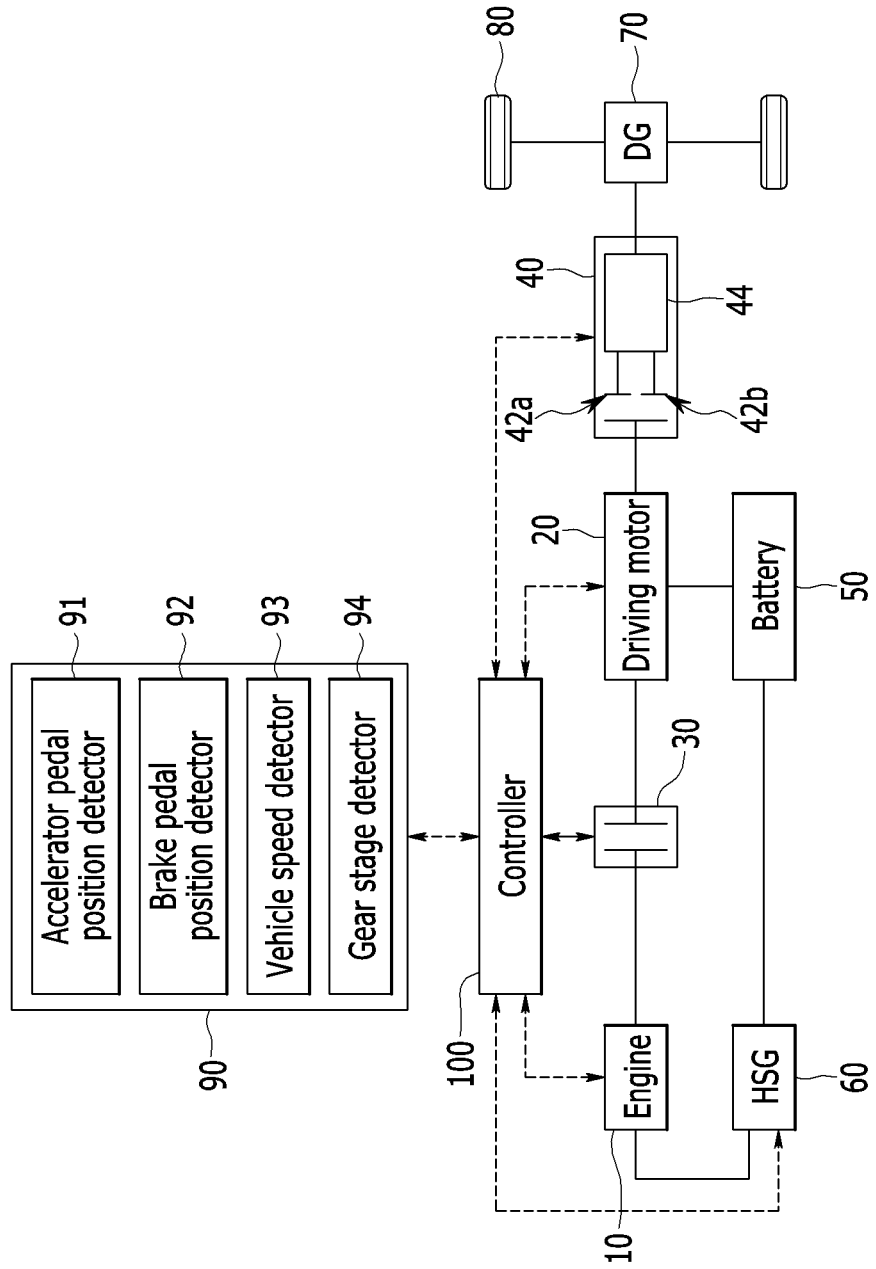

(51) Int. Cl.
*B60W 10/02* (2006.01)
*B60W 30/18* (2012.01)
*B60K 6/36* (2007.10)
*B60K 6/387* (2007.10)
*B60K 6/48* (2007.10)
*B60W 10/113* (2012.01)
*B60W 20/00* (2016.01)
*B60L 7/10* (2006.01)

(52) U.S. Cl.
CPC .......... *B60W 10/02* (2013.01); *B60W 10/113* (2013.01); *B60W 20/00* (2013.01); *B60W 30/18072* (2013.01); *B60W 30/18109* (2013.01); *B60K 2006/4825* (2013.01); *B60L 7/10* (2013.01); *B60W 2510/1005* (2013.01); *B60W 2520/10* (2013.01); *B60W 2520/105* (2013.01); *B60W 2540/10* (2013.01); *B60W 2540/12* (2013.01); *Y02T 10/76* (2013.01); *Y10S 903/946* (2013.01)

(58) Field of Classification Search
USPC ........................................ 701/22; 477/3, 121
See application file for complete search history.

(56) References Cited

U.S. PATENT DOCUMENTS

| | | | |
|---|---|---|---|
| 2015/0191168 A1* | 7/2015 | Mitsuyasu | B60W 20/00 701/54 |
| 2015/0203118 A1* | 7/2015 | Mitsuyasu | B60W 10/02 701/67 |
| 2015/0329119 A1* | 11/2015 | Sujan | F02D 41/08 701/54 |
| 2016/0325728 A1* | 11/2016 | Yang | B60L 3/108 |

FOREIGN PATENT DOCUMENTS

| | | |
|---|---|---|
| JP | 2013-087778 A | 5/2013 |
| JP | 5496056 | 3/2014 |
| JP | 2014-058286 A | 4/2014 |
| JP | 2014-145373 A | 8/2014 |
| KR | 10-2014-0048575 | 4/2014 |

* cited by examiner

APPARATUS AND METHOD FOR CONTROLLING HYBRID ELECTRIC VEHICLE INCLUDING DUAL CLUTCH TRANSMISSION

CROSS-REFERENCE TO RELATED APPLICATION

This application claims priority to and the benefit of Korean Patent Application No. 10-2015-0178257, filed on Dec. 14, 2015, which is incorporated herein by reference in its entirety.

FIELD

The present disclosure relates to an apparatus and a method for controlling a hybrid electric vehicle.

BACKGROUND

The statements in this section merely provide background information related to the present disclosure and may not constitute prior art.

Environmentally-friendly techniques of vehicles are very important and the survival of future motor industry is dependent thereon. Vehicle makers are focusing on development of environmentally-friendly vehicles so as to meet environmental and fuel consumption regulations.

Some examples of future vehicle techniques are a hybrid electric vehicle (HEV) and a dual clutch transmission (DCT).

The hybrid electric vehicle uses an internal combustion engine and a battery power source together. In other words, the hybrid electric vehicle efficiently combines and uses torque of the internal combustion engine and torque of a driving motor. Since the hybrid electric vehicle uses both of mechanical energy of the engine and electrical energy of the battery, desired operation regions of the engine and the motor may be used, and energy upon braking may be recovered, such that fuel efficiency may be improved and energy may be efficiently used.

The hybrid electric vehicle provides driving in an electric vehicle (EV) mode in which only torque of the driving motor is used; a hybrid electric vehicle (HEV) mode in which torque of the engine is used as main torque and torque of the driving motor is used as auxiliary torque; and a regenerative braking mode in which braking and inertial energy are recovered through electrical power generation of the driving motor during braking of the vehicle or during deceleration of the vehicle by inertia to be charged in the battery.

The DCT includes two clutches and a gear train applied to a manual transmission. The DCT selectively transmits torque output from a torque source (e.g., engine or driving motor) to two input shafts by using two clutches, changes a speed by using the gear train, and outputs the changed torque.

The DCT is used to realize a compact transmission having five or more forward speed stages. Since two clutches and synchronizers are controlled by a controller, a manual shift maneuver may be unnecessary for controlling the DCT. Therefore, the DCT is one type of automated manual transmission (AMT).

In the case of an automatic transmission, shifting is achieved by operation of friction elements (clutches and brakes) including a planetary gear train.

In contrast, in the case of the DCT, the shifting is achieved by operation of a shift clutch corresponding to a target gear stage after a speed gear corresponding to the target gear stage is connected to an output shaft corresponding to the target gear stage. Therefore, a speed gear corresponding to a next gear stage is connected to an output shaft corresponding to the next gear stage in advance so as to secure shift responsiveness, which is called a pre-selection (or pre-engagement). However, since a rotation shaft of the DCT is restricted when the pre-selection is performed, power delivery performance and fuel efficiency are deteriorated due to a drag loss. In other words, since the shift responsiveness and the fuel efficiency are in a trade-off relationship, it is difficult to achieve both of them.

Particularly, in the case of the hybrid electric vehicle, when the pre-selection is not unconditionally performed in the regenerative braking mode, shifting time is lengthened, and thus driving points (torque and speed) of the driving motor are deviated from a region where regeneration efficiency of the driving motor is high. When the pre-selection is unconditionally performed in the regenerative braking mode, the fuel efficiency is deteriorated due to the drag loss.

SUMMARY

The present disclosure present disclosure provides a method and an apparatus for controlling a hybrid electric vehicle having advantages of improving shift responsiveness and fuel efficiency by connecting a speed gear corresponding to a target gear stage of a dual clutch transmission (DCT) to an output shaft corresponding to the target gear stage when a shift condition before stopping is expected to be satisfied.

A method for controlling a hybrid electric vehicle including a dual clutch transmission according to the present disclosure may include: determining whether a coasting condition is satisfied and whether a current gear stage is greater than or equal to a predetermined gear stage; determining whether a brake pedal is pushed when the coasting condition is satisfied and the current gear stage is greater than or equal to the predetermined gear stage; determining whether deceleration of the hybrid electric vehicle is less than a predetermined deceleration when the brake pedal is pushed; connecting a speed gear corresponding to a target gear stage to an output shaft corresponding to the target gear stage when the deceleration of the hybrid electric vehicle is less than the predetermined deceleration; determining whether a shift condition before stopping from the current gear stage to the target gear stage is satisfied; and locking up a shift clutch corresponding to the target gear stage when the shift condition before stopping is satisfied.

Whether the coasting condition is satisfied may be determined based on a position value of an accelerator pedal, a position value of the brake pedal, and a speed of the hybrid electric vehicle.

The method may further include not connecting the speed gear corresponding to the target gear stage to the output shaft corresponding to the target gear stage in a state in which the coasting condition is satisfied, the current gear stage is greater than or equal to the predetermined gear stage, and the brake pedal is not pushed.

Whether the shift condition before stopping is satisfied may be determined based on a position value of an accelerator pedal, a speed of the hybrid electric vehicle, and the current gear stage.

An apparatus for controlling a hybrid electric vehicle according to an exemplary form of the present disclosure may include: a driving motor configured to generate torque using electricity of a battery and generate the electricity by recovering braking energy or inertial energy when the hybrid electric vehicle is driven by braking or coasting; a dual clutch transmission configured to be connected to the driving motor and including two shift clutches and a gear train; a data detector configured to detect data for controlling the hybrid electric vehicle; and a controller configured to control the dual clutch transmission based on the data, wherein the controller may determine whether a coasting condition is satisfied and whether a current gear stage is greater than or equal to a predetermined gear stage, may determine whether a brake pedal is pushed when the coasting condition is satisfied and the current gear stage is greater than or equal to the predetermined gear stage, may determine whether deceleration of the hybrid electric vehicle is less than a predetermined deceleration when the brake pedal is pushed, may connect a speed gear corresponding to a target gear stage to an output shaft corresponding to the target gear stage when the deceleration of the hybrid electric vehicle is less than the predetermined deceleration, may determine whether a shift condition before stopping from the current gear stage to the target gear stage is satisfied, and may lock up a shift clutch corresponding to the target gear stage when the shift condition before stopping is satisfied.

The controller may determine whether the coasting condition is satisfied based on a position value of an accelerator pedal, a position value of the brake pedal, and a speed of the hybrid electric vehicle.

The controller may not connect the speed gear corresponding to the target gear stage to the output shaft corresponding to the target gear stage in a state in which the coasting condition is satisfied, the current gear stage is greater than or equal to the predetermined gear stage, and the brake pedal is not pushed.

The controller may determine whether the shift condition before stopping is satisfied based on a position value of an accelerator pedal, a speed of the hybrid electric vehicle, and the current gear stage.

The data detector may include: an accelerator pedal position detector configured to detect a position value of an accelerator pedal; a brake pedal position detector configured to detect a position value of a brake pedal; a vehicle speed detector configured to detect a speed of the hybrid electric vehicle; and a gear stage detector configured to detect the current gear stage, wherein the controller may calculate the deceleration of the hybrid electric vehicle by differentiating the speed of the hybrid electric vehicle.

According to one form of the present disclosure, when the shift condition before stopping is expected to be satisfied, the speed gear corresponding to the target gear stage is connected to the output shaft corresponding to the target gear stage, thereby improving shift responsiveness and fuel efficiency.

Further areas of applicability will become apparent from the description provided herein. It should be understood that the description and specific examples are intended for purposes of illustration only and are not intended to limit the scope of the present disclosure.

DRAWINGS

Figure 2:
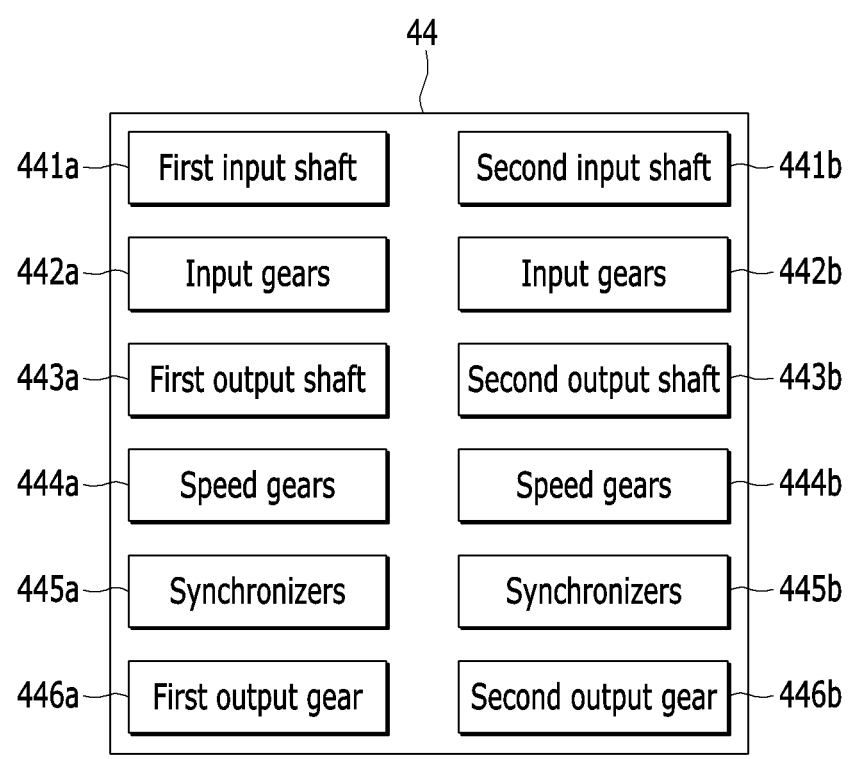
Figure 3:
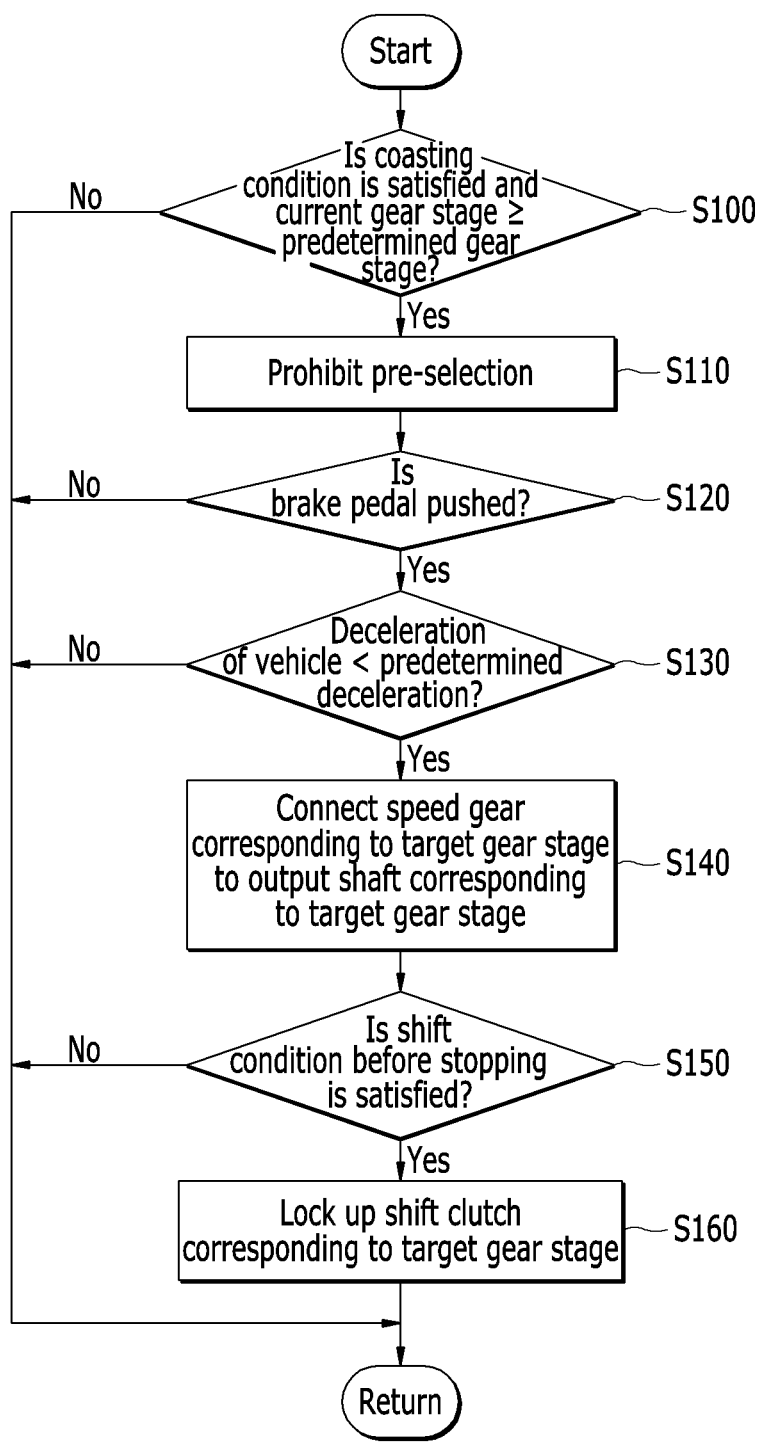

In order that the disclosure may be well understood, there will now be described various forms thereof, given by way of example, reference being made to the accompanying drawings, in which:

FIG. 1 is a diagram of a hybrid electric vehicle;
FIG. 2 is a block diagram of a gear train of a dual clutch transmission; and FIG. 3 is a flowchart of a method for controlling a hybrid electric vehicle.

<Description of symbols>

| | | |
|---|---|---|
| a. | 10: engine | 20: driving motor |
| b. | 30: engine clutch | 40: dual clutch transmission |
| c. | 50: battery | 60: HSG |
| d. | 70: differential gear device | 80: wheel |
| e. | 90: data detector | 100: controller |

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, each configuration illustrated in the drawings is arbitrarily shown for better understanding and ease of description, but the present disclosure is not limited thereto.

FIG. 1 is a diagram of a hybrid electric vehicle according to one form of the present disclosure, and FIG. 2 is a block diagram of a gear train of a dual clutch transmission according to the present disclosure.

As shown in FIG. 1, a hybrid electric vehicle includes an engine 10, a driving motor 20, an engine clutch 30 selectively connecting the engine 10 to the driving motor 20, a dual clutch transmission (DCT) 40, a battery 50, a hybrid starter & generator (HSG) 60, a differential gear device 70, a wheel 80, a data detector 90, and a controller 100.

The engine 10 combusts a fuel to generate torque, and various engines such as a gasoline engine, a diesel engine, and a liquefied petroleum injection (LPI) engine may be used as the engine 10.

The driving motor 20 generates torque using electricity of the battery 50. In addition, the driving motor 20 generates electricity by recovering braking energy or inertial energy when the hybrid electric vehicle is driven while braking or coasting (inertia).

In connection with torque transmission of the hybrid electric vehicle, torque generated by the engine 10 and/or the driving motor 20 is transmitted to an input shaft of the DCT 40, and torque output from an output shaft of the DCT 40 is transmitted to an axle via the differential gear device 70. The axle rotates the wheel 80 such that the hybrid electric vehicle runs by the torque generated by the engine 10 and/or the driving motor 20.

The hybrid electric vehicle provides driving in an electric vehicle (EV) mode in which only torque of the driving motor 20 is used, a hybrid electric vehicle (HEV) mode in which torque of the engine 10 is used as main torque and torque of the driving motor 20 is used as auxiliary torque, and a regenerative braking mode in which braking and inertial energy are recovered through electrical power generation of the driving motor 20 during braking of the vehicle or during deceleration of the vehicle by inertia to be charged in the battery 50.

The battery 50 supplies electricity to the driving motor 20 in the EV mode and the HEV mode, and is charged with electricity recovered through the driving motor 20 in the regenerative braking mode.

The HSG 60 starts the engine 10 or generates electricity according to an output of the engine 10. The HSG may refer to an integrated starter & generator (ISG).

The engine clutch 30 is disposed between the engine 10 and the driving motor 20. An input shaft of an engine clutch 30 is connected to the engine 10, and an output shaft of the engine clutch 30 is connected to the driving motor 20.

The DCT 40 is connected to the driving motor, and receives torque generated by the engine 10 and/or the driving motor 20. The DCT 40 includes two shift clutches 42a and 42b and a gear train 44. As shown in FIG. 2, the gear train 44 includes a first input shaft 441a, a second input shaft 441b, input gears 442a and 442b, a first output shaft 443a, a second output shaft 443b, speed gears 444a and 444b, synchronizers 445a and 445b, a first output gear 446a, and a second output gear 446b.

The first shift clutch 42a selectively transmits torque of the engine 10 and/or the driving motor 20 to the first input shaft 441a, and the second shift clutch 42b selectively transmits torque of the engine 10 and/or the driving motor 20 to the second input shaft 441b. The input gears 442a are fixedly disposed on the first input shaft 441a to achieve odd-numbered gear stages. The input gears 442b are fixedly disposed on the second input shaft 441b to achieve even-numbered gear stages. The speed gears 444a are rotatably disposed on the first output shaft 443a, and the speed gears 444b are rotatably disposed on the second output shaft 443b. The synchronizers 445a selectively connect the speed gears 444a to the first output shaft 443a, and the synchronizers 445b selectively connect the speed gears 444b to the second output shaft 443b. The first output gears 446a are fixedly disposed on the first output shaft 443a and transmit torque of the first output shaft 443a to the differential gear device 70. The second output gears 446b are fixedly disposed on the second output shaft 443b and transmit torque of the second output shaft 443b to the differential gear device 70. Since the configuration of the DCT 40 is well known in the art, a detailed description thereof will be omitted in the present specification. The present disclosure is applied to any dual clutch transmissions.

The data detector 90 detects data for controlling the hybrid electric vehicle, and the data detected by the data detector is transmitted to the controller 100.

The data detector 90 may include an accelerator pedal position detector 91, a brake pedal position detector 92, a vehicle speed detector 93, and gear stage detector 94. The data detector 90 may further include detectors (e.g., an engine speed detector and a motor speed detector) for controlling the hybrid electric vehicle.

The accelerator pedal position detector 91 detects a position value of an accelerator pedal (i.e., a pushed degree of the accelerator pedal), and transmits a signal corresponding thereto to the controller 100. When the accelerator pedal is pushed fully, the position value of the accelerator pedal is 100%, and when the accelerator pedal is not pushed, the position value of the accelerator pedal is 0%.

The brake pedal position detector 92 detects whether a brake pedal is pushed or not and transmits a signal corresponding thereto to the controller 100. When the brake pedal is pushed fully, a position value of the brake pedal is 100%, and when the brake pedal is not pushed, the position value of the brake pedal is 0%.

The vehicle speed detector 94 detects a speed of the hybrid electric vehicle and transmits a signal corresponding thereto to the controller 100.

The gear stage detector 95 detects a gear stage that is currently engaged and transmits a signal corresponding thereto to the controller 100. For example, gear stages which may be engaged may be first, second, third, fourth, fifth, sixth, and seventh gear stages, and a reverse gear stage, in a seven-speed transmission.

The controller 100 controls switching between the EV mode and the HEV mode based on driving conditions of the hybrid electric vehicle. In addition, the controller 100 controls the engine 10, the driving motor 20, the DCT 40, and the HSG 60 based on the data detected by the data detector 90. Further, the controller 100 determines a target gear stage and controls shifting to the target gear stage. The controller 100 may be implemented with one or more processors executed by a predetermined program. The predetermined program may include a series of commands for performing each step included in a method for controlling a hybrid electric vehicle according to an exemplary form of the present disclosure to be described below.

Hereinafter, a method for controlling a hybrid electric vehicle according to one form of the present disclosure will be described in detail with reference to FIG. 3.

FIG. 3 is a flowchart of a method for controlling a hybrid electric vehicle.

As shown in FIG. 3, a method for controlling a hybrid electric vehicle begins with determining whether a coasting condition is satisfied and whether a current gear stage is greater than or equal to a predetermined gear stage at step S100.

The controller 100 may determine whether the coasting condition is satisfied based on the position value of the accelerator pedal, the position value of the brake pedal, and the speed of the hybrid electric vehicle. For example, the coasting condition may be satisfied when the position value of the accelerator pedal and the position value of the brake pedal are 0% in a state where the hybrid electric vehicle is moving.

The predetermined gear stage may be the second gear stage. Hereinafter, the sixth gear stage will be exemplified as the current gear stage, and the second shift clutch 42b, the second input shaft 441b, the second output shaft 443b, and the speed gear 444b will be exemplified as a shift clutch, an input shaft, an output shaft, and a speed gear that correspond to the current gear stage. In this case, the second shift clutch 42b corresponding to the current gear stage is in a lock-up state (a state in which the second shift clutch 42b is fully engaged).

When the coasting condition is not satisfied or the current gear stage is less than the predetermined gear stage at step S100, the controller 100 finishes the method for controlling the hybrid electric vehicle.

When the coasting condition is satisfied and the current gear stage is greater than or equal to the predetermined gear stage at step S100, the controller 100 does not connect the speed gear 444a corresponding to a target gear stage (e.g., the fifth gear stage that is less than the sixth gear stage that is the current gear stage) to the first output shaft 443a corresponding to the target gear stage at step S110. In other words, pre-selection (pre-engagement) for down-shifting is inhibited, thereby reducing drag loss of the DCT 40 and improving fuel efficiency of the hybrid electric vehicle.

When the coasting condition is satisfied and the current gear stage is greater than or equal to the current gear stage at step S100, the controller 100 determines whether the brake pedal is pushed or not at step S120. The controller 100 may determine whether the brake pedal is pushed based on the signal detected by the brake pedal position sensor 92. For example, when the position value of the brake pedal is greater than 0%, the controller 100 determines that the brake pedal is pushed.

When the brake pedal is not pushed at step S120, the controller 100 finishes the method for controlling the hybrid electric vehicle.

When the brake pedal is pushed at step S120, the controller 100 determines whether deceleration of the hybrid electric vehicle is less than a predetermined deceleration at step S130. The predetermined deceleration may be set to a value determined by a person of ordinary skill in the art to determine whether the down-shifting from the current gear stage to the target gear stage is expected. The controller 100 may calculate the deceleration of the hybrid electric vehicle by differentiating the speed of the hybrid electric vehicle.

When the deceleration of the hybrid electric vehicle is greater than or equal to the predetermined deceleration at step S130, the controller 100 finishes the method for controlling the hybrid electric vehicle.

When the deceleration of the hybrid electric vehicle is less than the predetermined deceleration at step S130, the controller 100 connects the speed gear 444a corresponding to the target gear stage to the first output shaft 443a corresponding to the target gear stage, and stands by so as to lock up the first shift clutch 42a corresponding to the target gear stage at step S140. In other words, when the down-shifting from the current gear stage to the target gear stage is expected as the speed of the hybrid electric vehicle rapidly decreases, the pre-selection may be performed.

The controller 100 determines whether a shift condition before stopping from the current gear stage to the target gear stage is satisfied at step S150. In other words, the controller 100 determines whether the down-shifting is required as the speed of the hybrid electric vehicle decreases. The controller 100 may determine whether the shift condition before stopping is satisfied by using a shift pattern map based on the position value of the accelerator pedal, the speed of the hybrid electric vehicle, and the current gear stage. For example, the shift condition before stopping may be satisfied when the position value of the accelerator pedal is 0% and the speed of the hybrid electric vehicle is less than or equal to a predetermined speed.

When the shift condition before stopping is not satisfied at step S150, the controller 100 finishes the method for controlling the hybrid electric vehicle.

When the shift condition before stopping is satisfied at step S150, the controller 100 locks up the first shift clutch 42a corresponding to the target gear stage S160. When the second shift clutch 42b corresponding to the current gear stage is released and the first shift clutch 42a corresponding to the target gear stage is locked up, the down-shifting to the target gear stage is realized.

As described above, when the shift condition before stopping is expected to be satisfied, the speed gear corresponding to the target gear stage is connected to the output shaft corresponding to the target gear stage, thereby reducing shifting time and improving shift responsiveness. As a result, since driving points (torque and speed) of the driving motor 20 are not deviated from a region where regeneration efficiency of the driving motor 20 is high, fuel efficiency of the hybrid electric vehicle may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A method for controlling a hybrid electric vehicle including a dual clutch transmission, comprising:
   determining whether a coasting condition is satisfied and whether a current gear stage is greater than or equal to a predetermined gear stage;
   determining whether a brake pedal is pushed when the coasting condition is satisfied and the current gear stage is greater than or equal to the predetermined gear stage;
   determining whether deceleration of the hybrid electric vehicle is less than a predetermined deceleration when the brake pedal is pushed;
   connecting a speed gear corresponding to a target gear stage to an output shaft corresponding to the target gear stage when the deceleration of the hybrid electric vehicle is less than the predetermined deceleration;
   determining whether a shift condition before stopping from the current gear stage to the target gear stage is satisfied; and
   locking up a shift clutch corresponding to the target gear stage when the shift condition before stopping is satisfied.

2. The method of claim 1, wherein whether the coasting condition is satisfied is determined based on a position value of an accelerator pedal, a position value of the brake pedal, and a speed of the hybrid electric vehicle.

3. The method of claim 1, further comprising not connecting the speed gear corresponding to the target gear stage to the output shaft corresponding to the target gear stage in a state in which the coasting condition is satisfied, the current gear stage is greater than or equal to the predetermined gear stage, and the brake pedal is not pushed.

4. The method of claim 1, wherein whether the shift condition before stopping is satisfied is determined based on a position value of an accelerator pedal, a speed of the hybrid electric vehicle, and the current gear stage.

5. An apparatus for controlling a hybrid electric vehicle, comprising:
   a driving motor configured to generate torque using electricity of a battery and generate the electricity by recovering braking energy or inertial energy when the hybrid electric vehicle is driven by braking or coasting;
   a dual clutch transmission configured to be connected to the driving motor and including two shift clutches and a gear train;
   a data detector configured to detect data for controlling the hybrid electric vehicle; and
   a controller configured to control the dual clutch transmission based on the data,
   wherein the controller determines whether a coasting condition is satisfied and whether a current gear stage is greater than or equal to a predetermined gear stage,
   determines whether a brake pedal is pushed when the coasting condition is satisfied and the current gear stage is greater than or equal to the predetermined gear stage,
   determines whether deceleration of the hybrid electric vehicle is less than a predetermined deceleration when the brake pedal is pushed,
   connects a speed gear corresponding to a target gear stage to an output shaft corresponding to the target gear stage when the deceleration of the hybrid electric vehicle is less than the predetermined deceleration, determines whether a shift condition before stopping from the current gear stage to the target gear stage is satisfied, and locks up a shift clutch corresponding to the target gear stage when the shift condition before stopping is satisfied.

6. The apparatus of claim 5, wherein the controller determines whether the coasting condition is satisfied based on a position value of an accelerator pedal, a position value of the brake pedal, and a speed of the hybrid electric vehicle.

7. The apparatus of claim 5, wherein the controller does not connect the speed gear corresponding to the target gear stage to the output shaft corresponding to the target gear stage in a state in which the coasting condition is satisfied, the current gear stage is greater than or equal to the predetermined gear stage, and the brake pedal is not pushed.

8. The apparatus of claim 5, wherein the controller determines whether the shift condition before stopping is satisfied based on a position value of an accelerator pedal, a speed of the hybrid electric vehicle, and the current gear stage.

9. The apparatus of claim 5, wherein the data detector comprises:

an accelerator pedal position detector configured to detect a position value of an accelerator pedal;

a brake pedal position detector configured to detect a position value of a brake pedal;

a vehicle speed detector configured to detect a speed of the hybrid electric vehicle; and a gear stage detector configured to detect the current gear stage, wherein the controller calculates the deceleration of the hybrid electric vehicle by differentiating the speed of the hybrid electric vehicle.

* * * * *